United States Patent
Colven et al.

(10) Patent No.: US 9,049,149 B2
(45) Date of Patent: Jun. 2, 2015

(54) MINIMAL DATA LOSS LOAD BALANCING ON LINK AGGREGATION GROUPS

(75) Inventors: D. Michael Colven, Dallas, TX (US); Venkata Ramana Kiran Addanki, Montvale, NJ (US); Sanjay Gera, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 13/436,537

(22) Filed: Mar. 30, 2012

(65) Prior Publication Data

US 2013/0258838 A1  Oct. 3, 2013

(51) Int. Cl.
*H04L 12/939* (2013.01)
*H04L 12/861* (2013.01)

(52) U.S. Cl.
CPC ............. *H04L 49/552* (2013.01); *H04L 49/90* (2013.01); *H04L 49/557* (2013.01)

(58) Field of Classification Search
CPC ..... H04L 45/245; H04L 47/10; H04L 47/125; H04L 49/552; H04L 49/90; H04L 69/14; H04L 47/2441; H04L 49/30; H04L 69/40; H04L 43/0882; H04L 41/00; H04L 47/41; H04L 41/0654
USPC ......... 370/218, 228, 392, 221, 238, 227, 216, 370/230, 412; 709/227
See application file for complete search history.

(56) References Cited

U.S. PATENT DOCUMENTS

| | | | |
|---|---|---|---|
| 6,553,029 B1 | 4/2003 | Alexander | |
| 7,345,991 B1 * | 3/2008 | Shabtay et al. | 370/221 |
| 7,606,141 B2 * | 10/2009 | Schimke et al. | 370/216 |
| 7,623,456 B1 | 11/2009 | Chen et al. | |
| 7,626,930 B2 * | 12/2009 | Agmon et al. | 370/230 |
| 7,936,770 B1 * | 5/2011 | Frattura et al. | 370/412 |
| 8,248,952 B2 * | 8/2012 | Gallagher et al. | 370/238 |
| 8,488,608 B2 * | 7/2013 | Mohandas et al. | 370/392 |
| 2011/0225303 A1 * | 9/2011 | Engebretson | 709/227 |
| 2012/0182866 A1 * | 7/2012 | Vinayagam et al. | 370/228 |
| 2013/0028072 A1 | 1/2013 | Addanki | |
| 2013/0083797 A9 * | 4/2013 | Narasimhan | 370/392 |

OTHER PUBLICATIONS

IEEE, "802,.1ad", IEEE Computer Society; Virtual Bridged Local Area Networks; pp. 1-129, Sep. 27, 2004.
IEEE, "802.1AX-2008-LAG", IEEE Computer Society; Link Aggregation; pp. 1-163, Nov. 3, 2008.
IEEE 802.1AX (2008): IEEE Std. 802.1AX-2008: IEEE Standard for Local and metropolitan area networks—Link Aggregation.

* cited by examiner

*Primary Examiner* — Christopher Grey
*Assistant Examiner* — Oussama Roudani
(74) *Attorney, Agent, or Firm* — Maschoff Brennan (57) ABSTRACT

An example embodiment includes a network element. The network element includes an ingress port, an ingress line card, a link aggregation group (LAG) including multiple egress ports, and a distributor. The ingress port receives multiple packets including flood traffic. The ingress line card separates the packets into buckets. The distributor is configured to allocate the buckets to the egress ports, transmit the buckets to the egress ports, and when a failed egress port is identified, reallocate the buckets from the failed egress port to at least one functional egress port while continuing to transmit the buckets to functional egress ports of the LAG.

23 Claims, 9 Drawing Sheets

MINIMAL DATA LOSS LOAD BALANCING ON LINK AGGREGATION GROUPS

FIELD

The embodiments discussed herein are related to network communications.

BACKGROUND

A communication network may include network elements that route packets through the communication network. Some network elements may include a distributed architecture, in which packet processing may be distributed among several subsystems of a given network element. Some example subsystems of the network elements may include, but are not limited to, line cards, switches, bridges, and traffic managers. Some network elements may be used in a communication network as a multifunction Ethernet aggregation network element ("multifunction network element"), which may support one or more functions such as link aggregation, hashing, load balancing, or some combination thereof.

The multifunction network element may include a distributed architecture including one or more line cards and/or a bridge. Each of the line cards may include a modular electronic device that may provide network communication functionality. For example, some line cards may include, among other things, an Ethernet switch that may switch traffic through the network element and into a local area network (LAN). Additionally, the line cards may include modules that may process data such as frames or packets. The packets or frames may contain information such as a source address, a media access control (MAC) address, a destination address, data, or some combination thereof.

Like the line cards, the bridge may include a modular electronic device that provides network communication functionality. For example, the bridge may include, among other things, an Ethernet switch, ports, and modules to process hash rules and addresses. The modules may include processing resources and a memory configured to perform a hash rule that maps data received at ingress ports to output at egress ports. The modules may perform matching on any of the fields provided in a typical Ethernet packet at the ingress port to determine which egress port to map the data too. The data may also be flooded or multicast to all egress ports on the bridge. When data is flooded, packets incoming from one source are transmitted to multiple destinations coupled to the egress ports without duplication. The destinations often share a group address so that only the devices that want the data receive it.

Additionally, communication networks may employ link aggregation. Link aggregation may generally describe the practice of using multiple network cables or ports in parallel to increase link speeds beyond the limits of any single cable or port. An example link aggregation standard is e.g., IEEE 802.1AX-2008. Link aggregation may increase redundancy for higher availability. In link aggregation, a group or set of ports may be combined and represented as a single logical port to other components of the network system. Various switching elements of the network system may "see" the aggregated ports known as a link aggregation group ("LAG") as a single logical communication port in the routing tables or databases of network elements external to the LAG.

In addition, to ensure high reliability and availability in communication networks, load balancing may be used. When implemented, load balancing may provide an effective utilization of bandwidth. In load balancing, data streams at the ingress port may be divided and transmitted on multiple ports in the LAG. In some circumstances, however, the multiple ports in the LAG may change. For example, a port may fail or be repaired from a previous failure. Following the changes to the LAG, a network element may perform another load balancing. During the load balancing following a change to the LAG, data may be lost.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system includes a network element. The network element includes an ingress port, an ingress line card, a link aggregation group (LAG) including multiple egress ports, and a distributor. The ingress port receives multiple packets including flood traffic. The ingress line card separates the packets into buckets. The distributor is configured to allocate the buckets to the egress ports, transmit the buckets to the egress ports, and when a failed egress port is identified, reallocate the buckets from the failed egress port to at least one functional egress port while continuing to transmit the buckets to functional egress ports of the LAG.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
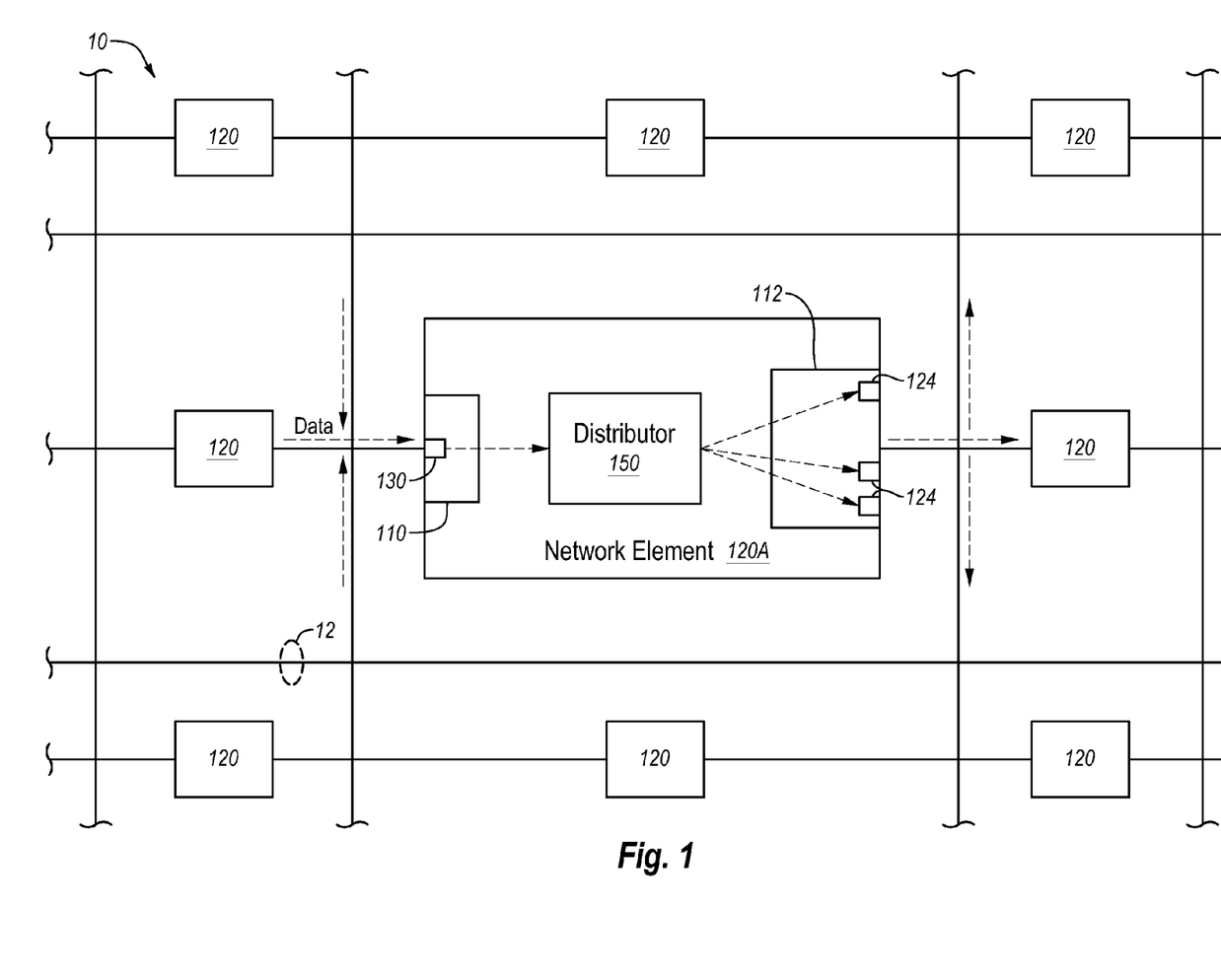
FIG. 1 illustrates a block diagram of an example network in which some embodiments may be implemented.

FIG. 1 illustrates a block diagram of an example network 10 in which some embodiments may be implemented. Generally, the network 10 may include transmission media 12 that communicatively couple network elements 120, including network element 120A. Any configuration of any number of network elements 120 and other devices may form the network 10. In addition, the network 10 may be integrated into and/or form a portion of one or more other networks. That is, although the network 10 is shown in a particular configuration, the network 10 may also be configured as a ring network, a point-to-point network, for example. Also, the network 10 may be a portion of a local area network (LAN), a wide area network (WAN), for example.

The network elements 120 may include any equipment and/or facility that provide services related to telecommunication. An example configuration of the network element 120A is depicted in FIG. 1. The other network elements 120 may be configured similar to or different than the network element 120A.

The network element 120A may include an ingress line card 110 and one or more egress line cards 112 (collectively, line cards 110 and 112). In the network 10, the network element 120A may be coupled to other network elements 120 via the line cards 110 and 112. Data, represented by dashed lines in FIG. 1, may be received at an ingress port 130 of the ingress line cards 110 and may be dispatched to another point in the communication network 10 via egress ports 124 on the egress line card 112. The line cards 110 and 112 may be communicatively coupled via the transmission medium 12 to other network elements 120. Additionally, the line cards 110 and 112 may enable the network element 120A to communicate to other network elements 120 using any suitable transmission protocol and/or standard. Each of the line cards 110 or 112 may include, but is not limited to, an Ethernet port, an optical port, or any other suitable port. In some embodiments, the ingress lines cards 110 may be interfaced to clients (not shown) of a network provider (not shown) while an egress lines card 112 may be interfaced to a provider network.

In the depicted embodiment, the network element 120A includes one ingress line card 110 with one ingress port 130 and one egress line card 112 with multiple egress ports 124. This depiction is not meant to be limiting, and more generally, each of the network elements 120 may include any number of line cards 110 and 112, ingress ports 130, and egress ports 124.

The network element 120A may include a hash rule and a distributor 150 that may manage communication of data from the ingress line card 110 to the egress line card 112. Specifically, the distributor 150 may match on information such as source or destination address in the data structured as a packet or a frame arriving at the ingress line card 110 to determine where to route the data, for instance. The hash rule may be applied to incoming data structured as a packet and/or may be applied at the egress ports 124 to separate the data into hash buckets or to map the data to specific egress ports 124. Additionally or alternatively, the distributor 150 may flood or multicast the data to most or all of the egress ports 124. An example of a distributor 150 may be one or more switch fabrics. Some additional details of the general function and the structure of the network element 120A are discussed below with respect to FIG. 2. Examples of the network element 120A may include, but are not limited to, an Ethernet switch or a multi-function Ethernet aggregation network element.

The line cards 110 and 112 and the distributor 150 in the network element 120 may include logic and memory. Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more controllers, one or more microcontrollers, and/or other logic.

A memory stores information. A memory may include one or more tangible, computer-readable, and/or computer-executable storage medium. Examples of memory include computer memory (for example, Random Access Memory (RAM) or Read Only Memory (ROM)), mass storage media (for example, a hard disk), flash memory, or other suitable memory, or any combination thereof.

As mentioned above, the network 10 includes the transmission media 12. Functionally, the transmission media 12 transport one or more signals communicated by network elements 120 throughout the network 10. Accordingly, each transmission medium 12 may include any system, device, or apparatus configured to communicatively couple the network elements 120 to each other and communicate information between corresponding network elements 120. For example, each transmission medium 12 may include any one or more of an optical fiber, an Ethernet cable, a Ti cable, a WiFi signal, a Bluetooth signal, etc.

The network 10 communicates data, which may be referred to as traffic, data traffic, or data streams, over transmission media 12. As used herein, "data" means information transmitted, stored, or sorted in the network 10. The data may be transmitted over transmission media 12 in the form of optical or electrical signals configured to represent audio, video, and/or textual data, for example. The data may also be real-time or non-real-time data. The data may be communicated via any suitable communications protocol, including, without limitation, the Open Systems Interconnection (OSI) standard and Internet Protocol (IP).

The data communicated in the network 10 may be structured in any appropriate manner including, but not limited to, being structured in frames, packets, or an unstructured bit stream. In general, certain types of data are transmitted in packets 132. For example, Ethernet data may be transmitted in packets 132. The packets 132 may contain multiple fields, which may include data, time stamps, source/destination addresses, and/or other identifying information.

Modifications, additions, or omissions may be made to the network 10 without departing from the scope of the disclosure. The components and elements of the network 10 described may be integrated or separated according to particular needs. Moreover, the operations of the network 10 may be performed by more, fewer, or other components.

Figure 2:
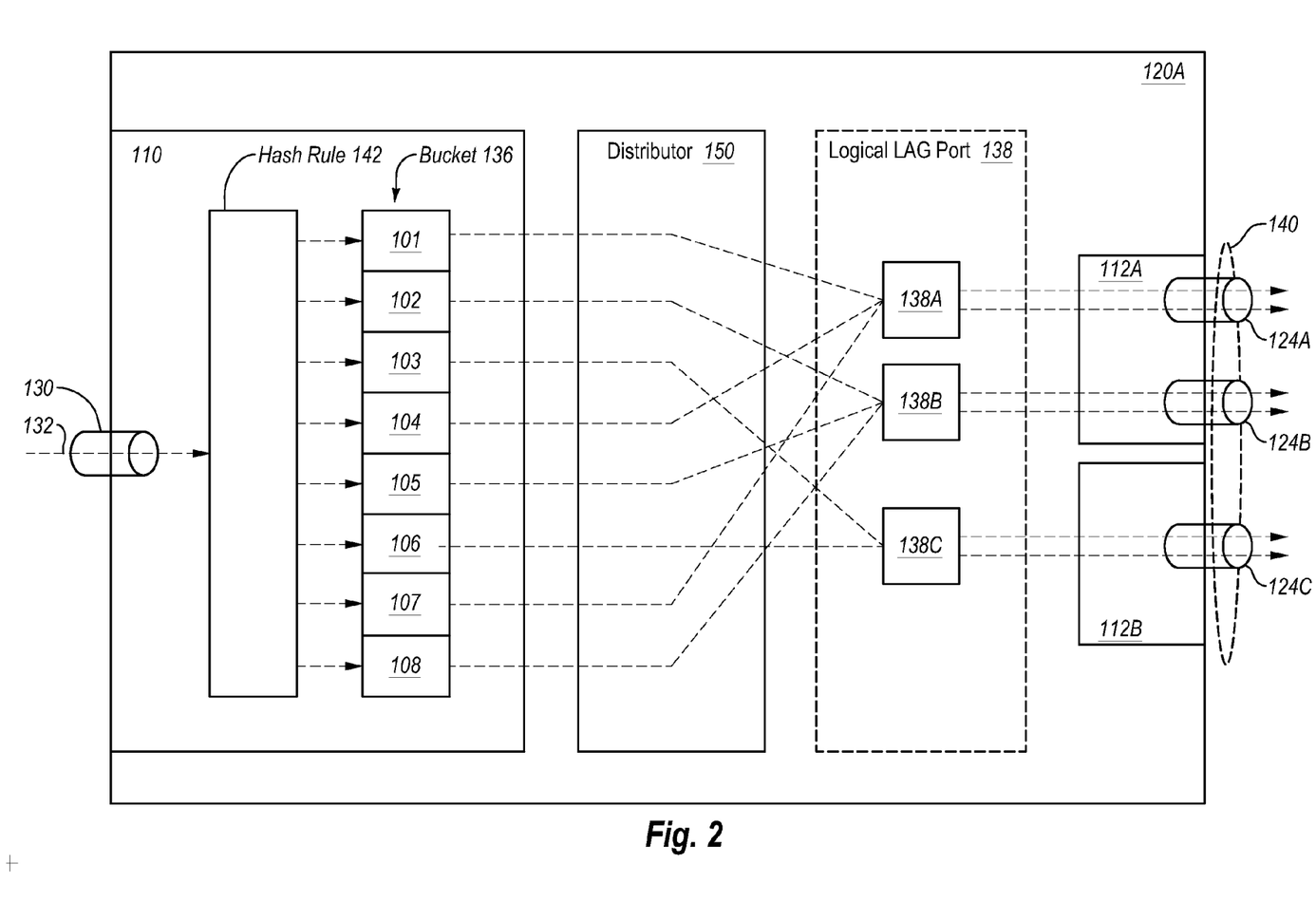
FIG. 2 illustrates a block diagram of an example network element that may be included in the network of FIG. 1.

FIG. 2 illustrates a block diagram of an example of the network element 120A that may be included in the network 10 of FIG. 1. Some or all of the other network elements 120 of FIG. 1 may be configured similar to or different than the network element 120A illustrated in FIG. 2. The network element 120A may include a link aggregation group (LAG) 140.

Additionally, and as described with respect to FIG. 1, the network element 120A may include the ingress line card 110 that may be coupled to the one or more egress line cards 112A and 112B through the distributor 150. The ingress line card 110 may generally be configured to receive packets 132 and transmit the packets 132 to the distributor 150. The distributor 150 may receive the packets 132, separate the packets 132, and transmit the packets 132 to egress line cards 112A and 112B. The distributor 150 may be configured to manage flow of the packet 132 between the ingress line card 110 and egress line cards 112A and 112B. In some embodiments, the distributor 150 may include a combination of hardware and software to manage receiving, processing, transmitting, forwarding or some combination thereof of the packets 132 through the network element 120A. The distributor 150 may include a computer readable medium (e.g., memory) and processing resources (not shown) to buffer, forward, and/or transmit the packets 132.

The ingress line card 110 may include an ingress port 130 to receive the packets 132. The packets 132 may include flood traffic. Flood traffic may occur if there is not a specific destination egress port 124 included with the packets 132. Thus, some packets 132 received at the ingress line card 110 may be flooded to multiple egress ports 124. When the packets 132 are flooded to multiple egress ports 124, this type of traffic may be referred to as "flood traffic." The flood traffic may cause the distributor 150 to transmit the packets 132 to all the egress ports 124 on the egress cards 112A and 112B. To balance the load of packets 132 and thereby avoid sending the same packets 132 to every egress port 124, the egress ports 124 may be grouped to form the LAG 140. In the LAG 140, the packets 132 may be divided amongst the egress ports 124 by a hash rule 142. The division of the packets 132 may speed the transmission of the packets 132.

In the depicted embodiment, the egress line card 112A includes two egress ports 124A and 124B while the egress line card 112B includes one egress port 124C. Additionally, as depicted, the LAG 140 includes the egress ports 124 from two egress line cards 112A and 112B. This depiction is not meant to be limiting. The LAG 140 may include more or less egress ports 124 on any number of egress line cards 112. That is, one or more egress ports 124 from different line cards 112 may be combined to create the LAG 140 or the LAG 140 may include egress ports 124 from a single egress line card 112. The LAG 140 may be seen logically as the same port to the external network even in instances where the egress ports 124 are not located on the same egress line card 112. The LAG 140 may be created for packets 132 to be divided among the egress line cards 112 within the LAG 140 during transmission, for instance. Dividing the packets 132 among the egress line cards 112 may increase the bandwidth and/or data rate of the transmission at the egress line cards 112 because the packets 132 are divided and transmitted in parallel on the egress ports 124 within the LAG 140.

The network element 120A may include processing resources and memory, not explicitly shown, to execute and store a hash rule 142 that divides the incoming packets 132 into buckets 136. Additionally or alternatively, the ingress line card 110 and the egress line cards 112A and 112B may include processing resources to further apply rules or mappings to packets 132 received at ingress line cards 110. In this and other embodiments, the packets 132 received at the ingress port 130 of ingress line card 110 may be hashed by the hash rule 142 into eight buckets 136 numbered 101-108. In some embodiments, the allocation by the distributor 150 may, for example, be based upon Multicast Group ID (MGID) tables or the distributor 150 may sort the packets 132 based on rules including, but not limited to, an Internal hardware flow ID, a Media Access Control (MAC) source/destination address plus the MAC IP source/destination address, an outer Virtual Local Area Network ID (VLAN ID or VID), a Multi-protocol Label Switching (MPLS) label plus the IP source/destination address.

The buckets 136 are allocated by the distributor 150 to the logical LAG ports 138 and then forwarded to the corresponding egress ports 124. The logical LAG ports 138 may include a one-to-one correlation with the egress ports 124 as depicted in FIG. 2. However, this depiction is not meant to be limiting. That is, one or more logical LAG ports 138 may correlate to one or more egress ports 124 and vice versa.

The distributor 150 may allocate the buckets 136 to the logical LAG ports 138 according to one or more allocation rules. In this and other embodiments, the allocation rules may include a round-robin distribution scheme. In the round-robin distribution scheme, a first bucket 101 may be allocated to a first logical LAG port 138A and may be forwarded to a first egress port 124A that corresponds to the first logical LAG port 138A. Likewise, a second bucket 102 may be allocated to a second logical LAG port 138B and may be forwarded to a second egress port 124B, etc. This pattern repeats resulting in the following allocation: the first bucket 101, a fourth bucket 104, and a seventh bucket 107 allocated to the first logical LAG port 138A that may be forwarded to the first egress port 124A; the second bucket 102, a fifth bucket 105, and an eighth bucket 108 allocated to the second logical LAG port 138B that may be forwarded to the second egress port 124B; and a third bucket 103 and a sixth bucket 106 allocated to a third logical LAG port 138C that may be forward to the third egress port 124C.

Once the allocation has been established, there may be changes to the configuration of the LAG 140. The changes may include, but are not limited to, a failure of, an addition of, a recovery of, or deleting one or more egress ports 124. Any of the changes listed above may include hardware and/or software changes. Following the change to the LAG 140, the distributor 150 may reallocate the buckets 136 while interrupting transmission to the fewest number of previously allocated buckets 136. That is, if the second egress port 124B fails, the distributor 150 may reallocate only the second bucket 102, the fifth bucket 105, and eighth bucket 108 allocated to the second egress port 124B, rather than reallocate all buckets 136.

Figure 3A:
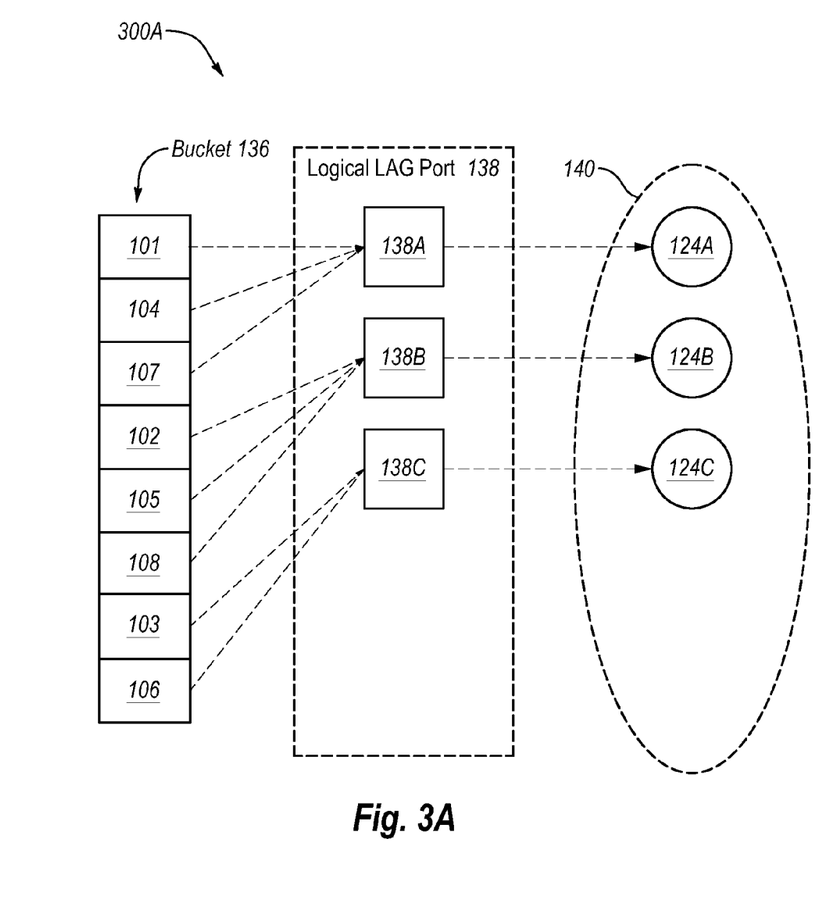
FIGS. 3A-3J illustrate block diagrams of link aggregation group load balance allocations and associated allocation tables.
Figure 3B:
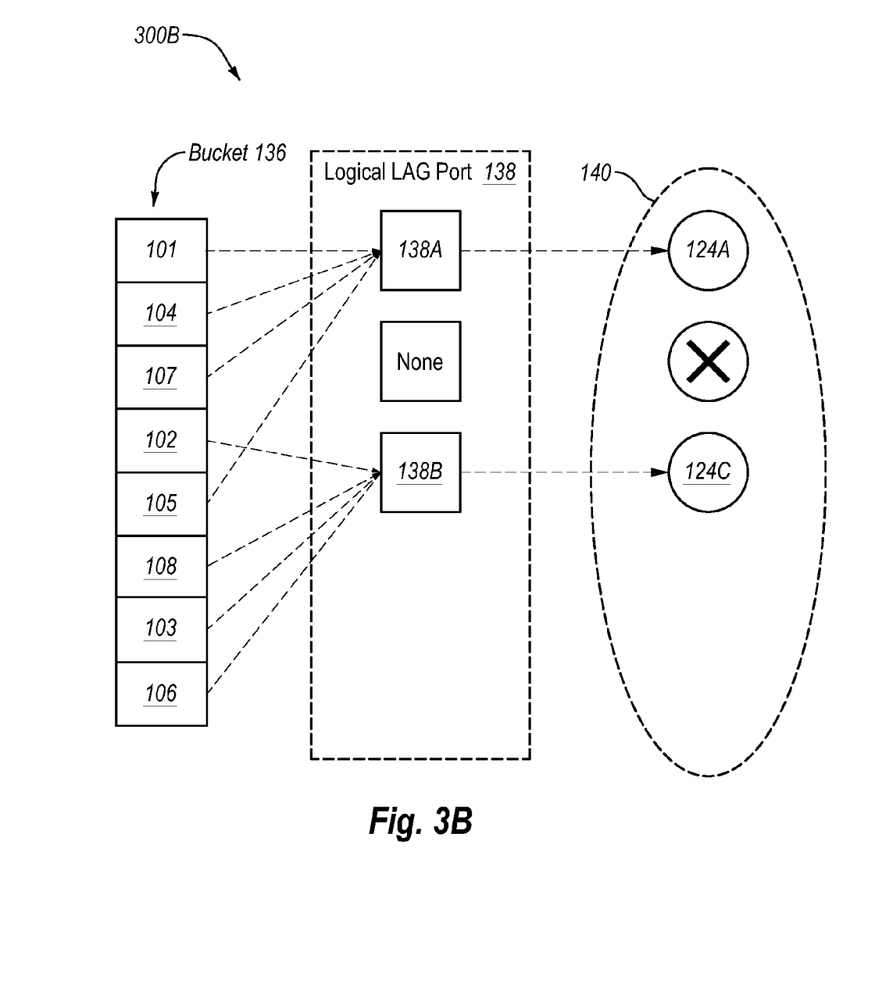
Figure 3C:
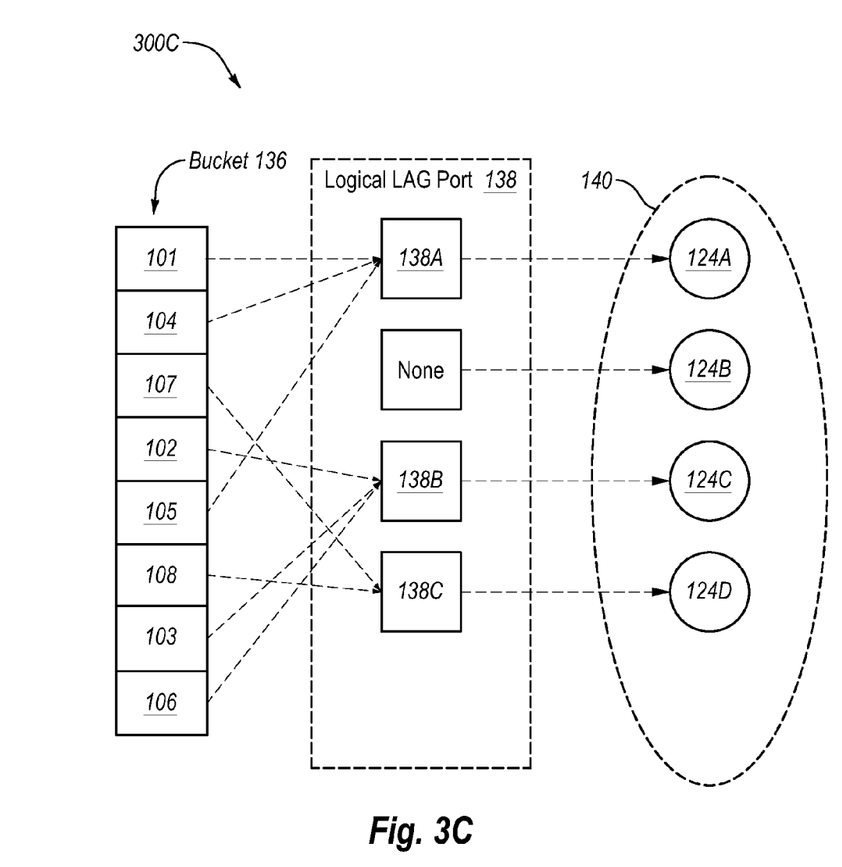
Figure 3D:
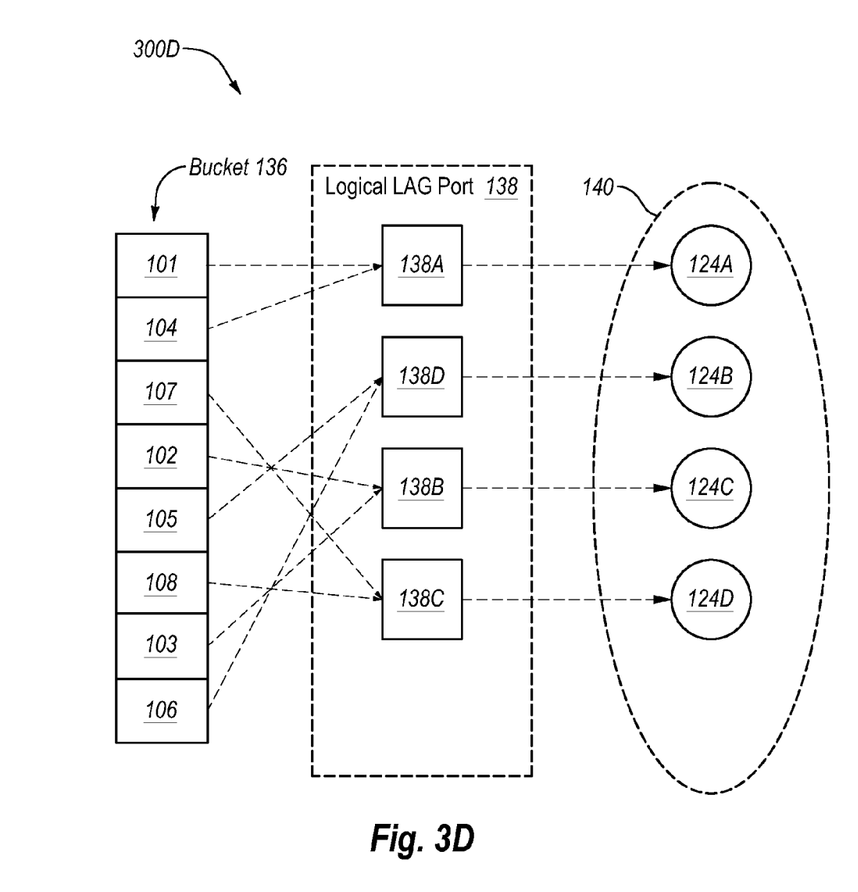
Figure 3E:
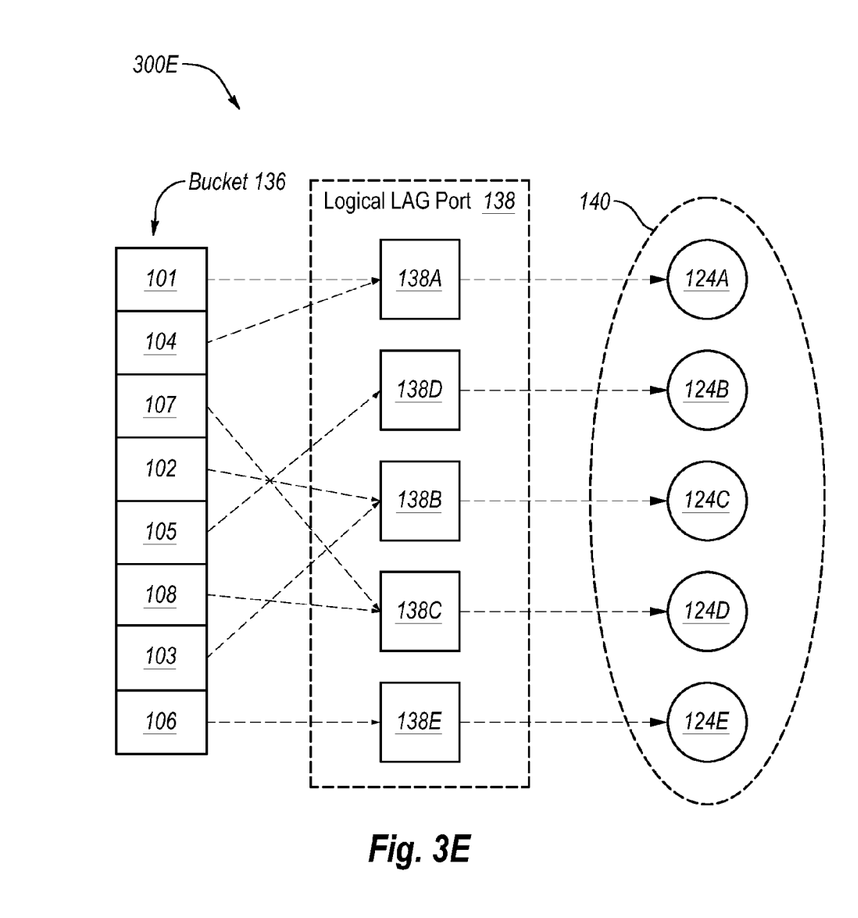

FIGS. 3A-3J illustrate block diagrams of LAG 140 load balance allocations 300A-300E and associated allocation tables 302A-302E. Specifically, FIG. 3A illustrates an initial load balance allocation 300A; FIG. 3B illustrates a load balance allocation 300B following a failure of an egress port 124; FIG. 3C illustrates a second initial load balance allocation 300C with a non-allocated egress port; FIG. 3D illustrates a load balance allocation 300D following an addition of an egress port 124; and FIG. 3E illustrates an alternative load balance allocation 300E following an addition of an egress port 124. Generally, in FIGS. 3A-3E some of the components of the network element 120A of FIGS. 1 and 2 have been omitted for simplicity. Each of FIGS. 3A-3E include the buckets 136 which have been variously re-ordered, the logical LAG ports 138, and the egress ports 124. The egress ports 124 and the logical LAG ports 138 represent the LAG 140.

The allocation tables 302A-302E of FIGS. 3F-3J list the buckets 136 allocated to each egress port 124 and logical LAG port 138 in the respective configuration of FIGS. 3A-3E. In particular, the allocation table 302A of FIG. 3F lists the buckets 136 allocated to each egress port 124 and logical LAG port 138 in the configuration of FIG. 3A. Similarly, the allocation table 302B of FIG. 3G lists the buckets 136 allocated to each egress port 124 and logical LAG port 138 in the configuration of FIG. 3B. Similarly, the allocation table 302C of FIG. 3H lists the buckets 136 allocated to each egress port 124 and logical LAG port 138 in the configuration of FIG. 3C. Similarly, the allocation table 302D of FIG. 3I lists the buckets 136 allocated to each egress port 124 and logical LAG port 138 in the configuration of FIG. 3D. Similarly, the allocation table 302E of FIG. 3J lists the buckets 136 allocated to each egress port 124 and logical LAG port 138 in the configuration of FIG. 3E.

With respect to the discussion herein regarding allocation and reallocation, the specific bucket 136 such as a first bucket 101 is not the focus. Instead, the number of buckets 136 allocated or reallocated to each egress port 124 and/or logical LAG port 138 may result in load balancing.

Figure 3F:
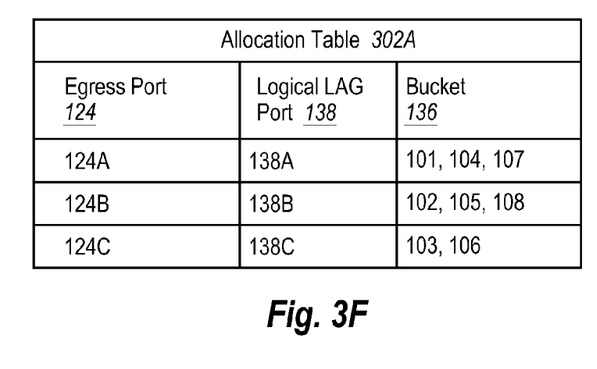

Turning first to FIGS. 3A and 3F, the initial load balance allocation 300A that may be based on the application of the round-robin distribution scheme described above. With a total of eight buckets 136 (including buckets 101-108), three buckets 136 (including buckets 101, 104, 107) are allocated to the first egress port 124A, three buckets 136 (including buckets 102, 105, 108) are allocated to the second egress port 124B, and two buckets 136 (including buckets 103, 106) are allocated to the third egress port 124C. This particular allocation is represented in the allocation table 302A of FIG. 3F. The round-robin distribution scheme may allocate the buckets 136 as evenly as possible. Because eight does not divide equally into three, at least one of the egress ports 124 is allocated a disproportionate number of buckets 136. Allocation table 302A represents in a table form the initial load balance allocation 300A of FIG. 3A.

FIG. 3B illustrates the load balance allocation 300B which may result following a failure in the second egress port 124B represented by the large X. A system and/or component such as the distributor 150 of FIG. 2 may identify that a failure occurred, identify which of the egress ports 124 failed, calculate a next port, perform a reallocation rule, or some combination thereof.

In the depicted embodiment, the failed egress port is the second egress port 124B and the functional egress ports include the first egress port 124A and the third egress port 124C. Because only the second egress port 124B failed, the buckets 136 allocated to egress ports 124A, 124C which are still functional may not be reallocated. Instead, the buckets 136 allocated to the functional egress ports 124A, 124C may be continuously transmitted. However, the buckets 136 allocated to the failed egress port 124B may be reallocated to the functional egress ports 124A, 124C.

In this and other embodiments, following a failure of an egress port 124, one or more of the logical LAG ports 138 may be renumbered. The renumbering may enable a predictive allocation of buckets 136 across logical LAG ports 138 of the LAG 140. With combined reference to FIGS. 3A and 3B, originally the buckets 136 (specifically buckets 101, 104, and 107) allocated to the first logical LAG port 138A were transmitted to the first egress port 124A, the buckets 136 (specifically buckets 102, 105, and 108) allocated to the second logical LAG port 138B were transmitted to the second egress port 124B, and the buckets 136 (specifically buckets 103 and 106) allocated to the third logical LAG port 138C were transmitted to the third egress port 124C. However, following the failure of the second egress port 124B, the logical LAG ports 138 have been re-number. As shown in FIG. 3B., the buckets 136 (specifically buckets 101, 104, 107, and 105) allocated to the first logical LAG port 138A are transmitted to the first egress port 124A, but the buckets 136 (specifically buckets 103, 106, 102, and 108) transmitted to the third egress port 124C are now allocated to the second logical LAG port 138B. The third logical LAG port 138C does not exist in the LAG 140 of FIG. 3B.

The reallocation of the buckets 136 in FIG. 3B may be performed according to the reallocation rule. The reallocation rule may be identical or similar to the allocation rule (described above). Additionally, the reallocation may result in an allocation in which the same number of buckets 136 are allocated to each logical LAG port 138 and/or egress port 124 as if the allocation rule was applied to a LAG that includes only the functional egress ports.

In some embodiments, the reallocation rule may include a calculation of the next port in a sequence, then an application of a reallocation round-robin scheme starting at the next port. Additionally, the reallocation rule may include a reallocation round-robin scheme that may apply to only the buckets 136 from the failed egress port. For example, in the illustrated embodiment, the second egress port 124B has failed. Thus, the second bucket 102, the fifth bucket 105, and the eighth bucket 108 which were previously allocated to the second egress port 124B may be reallocated according to the reallocation rule.

The calculation of the next port may determine the logical LAG port 138 and/or the egress port 124 at which the reallocation rule such as the reallocation round-robin scheme begins. In this and other embodiments, following the failure the logical LAG ports 138 may be re-numbered to ensure the reallocation results in a predictable allocation of buckets 138 across the LAG 140.

In some embodiments, the calculation of the next port includes a modulo operation. For example, the calculation of the next port may be performed according to the equations:

$P\text{start}=\text{MOD}(m,n)+1$; Next Port=$P$start if Next Port=the failed port; then Next Port=$\text{MOD}(m,n)+2$ if $P\text{start}>m$; then Next Port=$P\text{start}-m$;

if $P\text{start}\leq m$; then Next Port=$P\text{start}$;

In the calculation of the next port, MOD is the modulo operation, "m" is the number of buckets 136, "failed port" is the failed egress port, and "n" is the number of egress ports 124 included in the LAG 140 before the change. The calculation of the next port presented above is illustrative and the next port may be calculated by other operations. Additionally or alternatively, the next port may be recorded during the allocation.

Figure 3G:
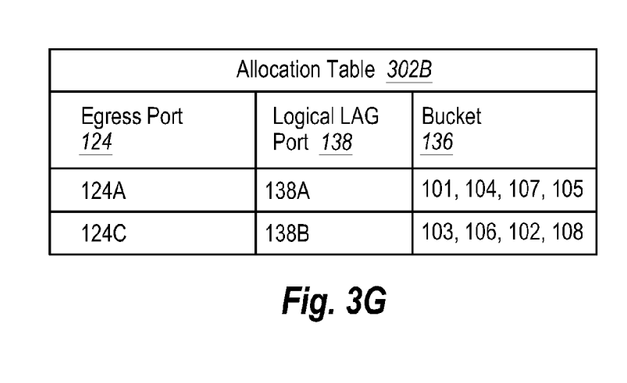

Accordingly, as illustrated in FIG. 3B, after the second egress port 124B has failed, the second bucket 102, the fifth bucket 105, and the eighth bucket 108 are reallocated to the functional egress ports—e.g., the first egress port 124A and the third egress port 124C. The allocation table 302B of FIG. 3G reflects the reallocation. Notably, the buckets 136 may be reallocated as evenly as possible. For example, the number of buckets 136 allocated to the first egress port 124A is equal to the number of buckets 136 allocated to the third egress port 124C. Allocation table 302B of FIG. 3G represents in a table form the load balance allocation 300B of FIG. 3B.

In contrast to FIG. 3B, the load allocations 300C-300E of FIGS. 3C, 3D, and 3E illustrate the addition of an egress port 124 to the LAG 140. Two types of additions of an egress port 124 to the LAG 140 are described below.

Figure 3H:
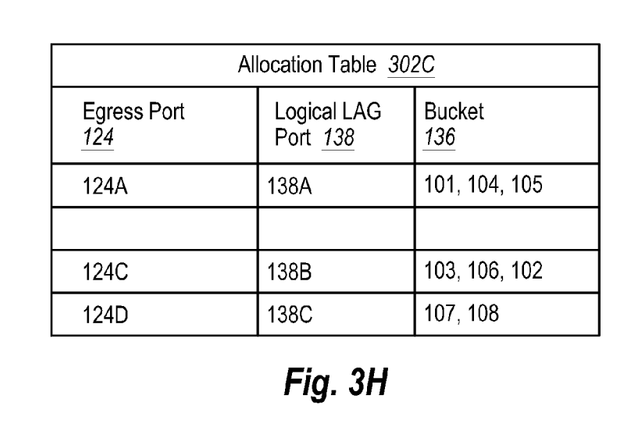

With combined reference to FIGS. 3C and 3D, the addition of an egress port 124 to the initial load balance allocation 300C with a disproportional, or uneven, quantity of buckets 136 per egress port 124 is illustrated. The load balance allocation 300C depicted in FIG. 3C is similar to that depicted in FIG. 3A with the addition of a non-allocated egress port i.e., the second egress port 124B. That is, like the initial allocation 300A of FIG. 3A, the load balance allocation 300C of FIG. 3C includes three buckets 136 (buckets 101, 104, and 105) allocated to the first logical LAG port 138A and transmitted to the first egress port 124A, three buckets 136 (buckets 103, 106, and 102) allocated to the second logical LAG port 138B and transmitted to the third egress port 124C, and two buckets 136 (buckets 107 and 108) allocated to the third logical LAG port 138C and transmitted to the fourth egress port 124D. In this and other embodiments, the number of the logical LAG port 138 does not coincide with the number of the egress port 124. Referring to FIG. 3H, the allocation table 302C represents in a table form the load balance allocation 300C of FIG. 3C.

FIG. 3D illustrates a reallocation that may occur after an addition of the second egress port 124B and a fourth logical LAG port 138D to the LAG 140. A system and/or a component such as the distributor 150 of FIG. 2 may identify that the addition has occurred, which of the egress ports 124 is the additional egress port, which egress ports 124 are existing ports prior to the addition, which of the existing ports are allocated the disproportional quantity of buckets 136, or some combination thereof.

In the depicted embodiment, the additional egress port is the second egress port 124B and the existing egress ports include the first egress port 124A, the third egress port 124C, and the fourth egress port 124D. Additionally, the first egress port 124A and the third egress port 124C are allocated the disproportional quantity of buckets 136.

Initially, the second egress port 124B does not have buckets 136 allocated to it after being added. Instead, all of the buckets 136 may be initially allocated to the existing egress ports, including the first, third, and fourth egress ports 124A, 124C, and 124D as described with respect to FIG. 3C. This intermediate configuration existing after addition of the second egress port 124B and prior to reallocating the buckets 136 is also represented in FIG. 3C. Generally, a subset of the buckets 136 allocated to the existing egress ports are reallocated to the additional egress port. The reallocation may interfere with functionally transmitting buckets 136 for those buckets 136 that are reallocated in some embodiments. However, the reallocation may be controlled to minimize and/or substantially eliminate loss during the reallocation through proper timing, etc.

Specifically, the reallocation may include identifying the existing egress ports 124 to which are allocated the disproportional quantity of the buckets 136. Identifying the existing egress ports 124 allocated the disproportional quantity of buckets 136 may be performed in a variety of ways. As discussed above with respect to FIG. 3B, in some embodiments, the addition and/or failure of one or more egress ports 124 may prompt a renumbering of the logical LAG ports 138. By renumbering the logical LAG ports 138 and following a round-robin distribution scheme according to the numbers designated for each logical LAG port 138, a system may know that lowered-numbered logical LAG ports 138 will be allocated the disproportional quantity of buckets 136.

Alternatively, the disproportional quantity of buckets 136 may be identified by knowing and/or recording the allocation; by knowing and/or recording the number of buckets 136, the number of egress ports 124, and where the allocation rule starts; by calculating a next port as discussed above and knowing the number of the disproportional quantity of buckets 136, some combination thereof, or an equivalent routine.

In this and other embodiments, the existing egress ports 124 allocated the disproportional quantity of buckets 136 include the first egress port 124A and the third egress port 124C (see FIGS. 3C). Reallocation may then include removing an excess quantity of buckets 136 from the existing egress ports 124 that cause the disproportionality and allocating them to the additional egress port 124. The excess quantity of buckets 136 may be equal to the difference in the number of buckets 136 allocated to some subset of egress ports 124. For example, in this and other embodiments, the first egress port 124A and the third egress port 124C are allocated three buckets 136 each while the fourth egress port 124D is allocated two buckets 136. Thus, the excess quantity may be one bucket 136 from each of the first egress port 124A and the third egress port 124C. In this example, one of the buckets 136 previously allocated to each of the first egress port 124A and the third egress port 124C, including a total of two buckets 136 (105, 106), are reallocated to the second egress port 124B.

In this and other embodiments, the additional egress port is the second egress port 124B. With the addition of the second egress port 124B, the LAG 140 may include four logical LAG ports 138. The added logical LAG port 138 is the fourth logical LAG port 138D which transmits buckets 136 to the second egress port 124B. That is, the newest logical LAG port 138 is numbered with the highest number. By numbering the newest logical LAG port 138 with the highest number, any reallocation may continue using a round-robin distribution scheme staring at the highest numbered logical LAG port 138.

Figure 3I:
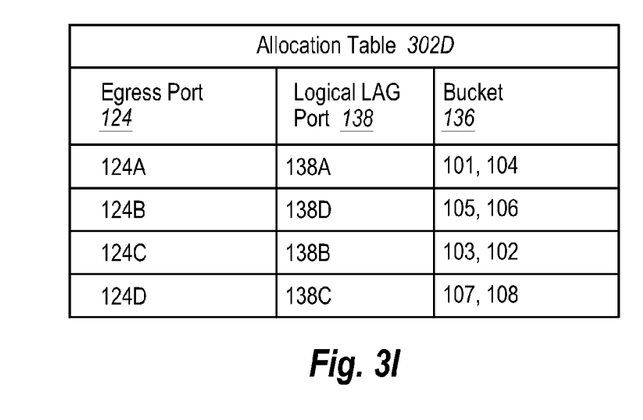

In some embodiments, during the reallocation, all buckets 136 that are not reallocated to the additional egress port are continuously transmitted. In this example, the buckets 136 not reallocated include all the buckets 136 on the fourth egress port 124D as well as two buckets 136 (101, 104) allocated to the first egress port 124A, and two buckets 136 (103, 102) allocated to the third egress port 124C. Referring to FIG. 3I, the allocation table 302D represents in a table form the load balance allocation 300D of FIG. 3D.

With combined reference to FIGS. 3D and 3E, the addition of an egress port 124 to the load balance allocation 300D with a proportional, or even, quantity of buckets 136 per egress port 124 is illustrated. The proportional quantity of buckets 136 is illustrated in FIG. 3D in which two buckets 136 are allocated to each of the egress ports 124. Another example of a proportional quantity of buckets 136 per egress port 124 is illustrated in FIG. 3B in which four buckets 136 are allocated to each of the egress ports 124.

In general, following the addition of an egress port 124, a bucket 136 is reallocated from one of the egress ports 124 and/or the LAG 140. FIG. 3E illustrates a reallocation that may occur after an addition of a fifth egress port 124E and a fifth logical LAG port 138E to the LAG 140 of FIG. 3D. A system and/or a component such as the distributor 150 of FIG. 2 may identify that the addition has occurred, which of the egress ports 124 is the additional egress port, which of the egress ports 124 are the existing egress ports prior to the addition or some combination thereof.

In the depicted embodiment, the additional egress port is the fifth egress port 124E and the existing egress ports include the first egress port 124A, the second egress port 124B, the third egress port 124C, and the fourth egress port 124D. Initially, the fifth egress port 124E does not have buckets 136 allocated to it after being added. Instead, all of the buckets 136 may be initially allocated to the existing egress ports, including the first, second, third, and fourth egress ports 124A-124D as described with respect to FIG. 3D. This intermediate configuration existing after addition of the fifth egress port 124E and prior to reallocating the buckets 136 is not shown. Generally, as above, a subset of the buckets 136 allocated to the existing egress ports are reallocated to the additional egress port. The reallocation may interfere with functionally transmitting buckets 136 for those buckets 136 that are reallocated in some embodiments. However, the reallocation may be controlled to minimize and/or substantially eliminate loss during the reallocation through proper timing, etc.

In contrast to the above reallocation, there may be no reason to identify existing egress ports 124 allocated the disproportional quantity of the buckets 136 because in this example, each egress port 124 is allocated a proportional number of buckets 136 (see FIG. 3D). Accordingly, the reallocation may instead include reapplying the allocation rule starting at a next egress port 124 and/or the next logical LAG port 138 as discussed above; knowing and/or recording the allocation; knowing and/or recording the number of buckets 136, the number of egress ports 124, and where the allocation rule starts; randomly; some combination thereof, or an equivalent routine. In this example, one of the buckets 136 (106) previously allocated to the second egress port 124B and the fourth logical LAG port 138D is reallocated to the fifth egress port 124E.

Figure 3J:
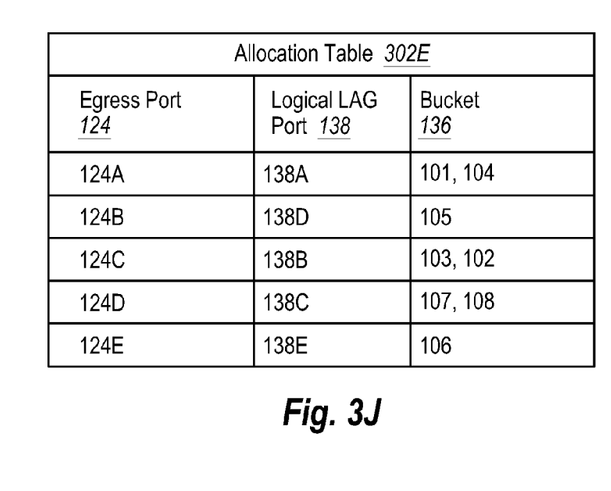

In some embodiments, during the reallocation, all buckets 136 that are not reallocated to the additional egress port are continuously transmitted. In this example, the buckets 136 not reallocated include all the buckets 136 on the first egress port 124A, the fourth egress port 124D, the third egress port 124C, as well as one bucket 136 (105) allocated to the second egress port 124D. Referring to FIG. 3J, the allocation table 302E represents in a table form the load balance allocation 300E of FIG. 3E.

Figure 4:
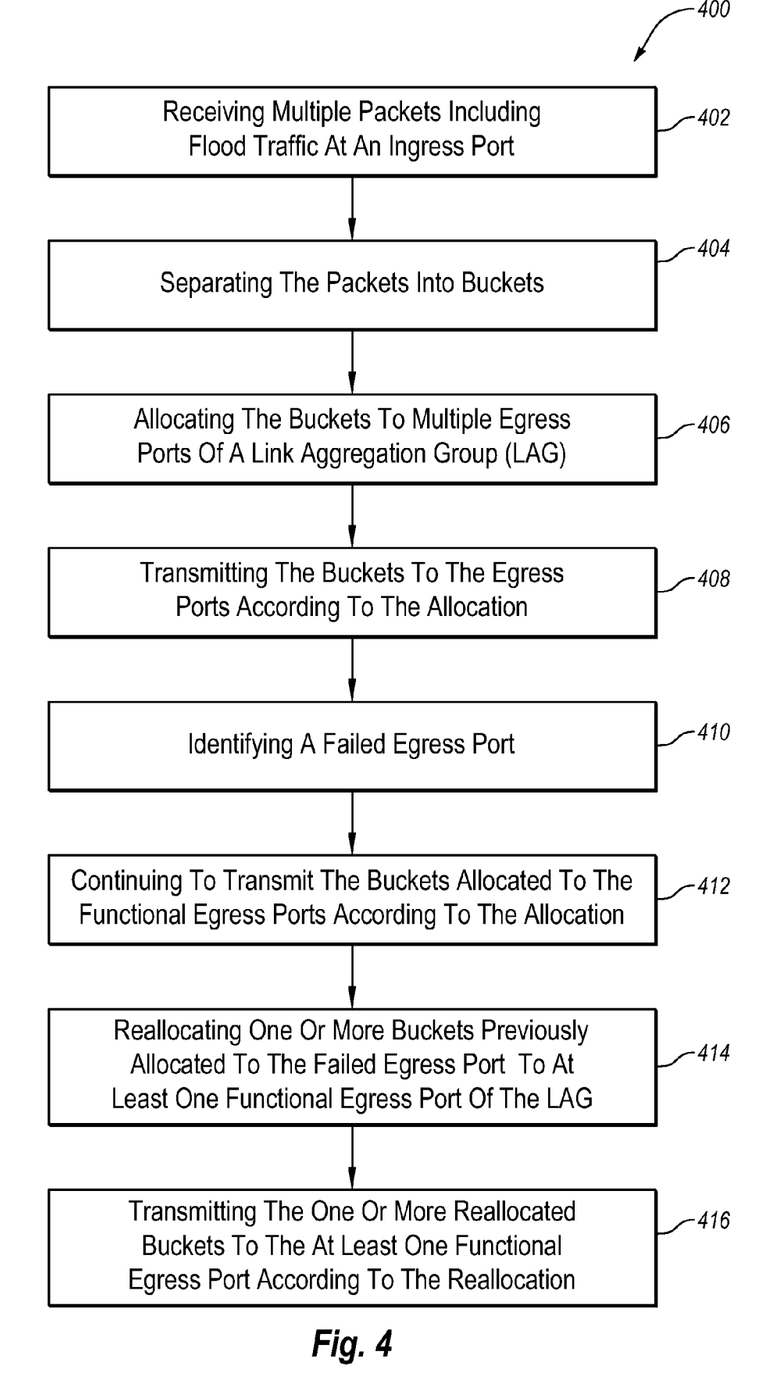
FIG. 4 is a flow diagram of an example method for reallocating buckets following a failure of an egress port.

FIG. 4 illustrates a flow diagram of an example method 400 for reallocating buckets following a failure of an egress port. The method 400 may be implemented in the network 10 of FIG. 1 and may be performed by the network element 120A of FIGS. 1 and 2 in some embodiments.

The method 400 may begin at 402 by receiving multiple packets including flood traffic at an ingress port. The packets may include various data including unicast, broadcast, or multicast data traffic.

At 404, the method 400 may include separating the packets into buckets. The packets may be separated by applying a hash rule. The hash rule may hash the packets according to MGID, for example. In some embodiments, the packets may be separated into eight buckets.

At 406, the method 400 may include allocating the buckets to multiple egress ports of a link aggregation group (LAG). In some embodiments, allocating the buckets may include allocating the buckets to multiple logical ports of the LAG that correspond one-to-one to the egress ports. Additionally, allocating the buckets to the egress ports may include applying a round-robin distribution scheme.

At 408, the method 400 may include transmitting the buckets to the egress ports according to the allocation.

At 410, the method 400 may include identifying a failed egress port. The failed egress port may include an egress port that was physically compromised. Alternatively, the failed egress port may include an egress port that was deleted through reconfiguration of software and/or hardware, for instance.

At 412, the method 400 may include continuing to transmit the buckets allocated to functional egress ports according to the allocation. Transmission of the buckets allocated to the functional egress ports may continue uninterrupted throughout the method 400.

At 414, the method may include reallocating one or more buckets previously allocated to the failed egress port to at least one functional egress port of the LAG. In some embodiments, the reallocation of the buckets from the failed egress port achieves a reallocation with the number of buckets allocated to the functional egress ports equal to the number of buckets allocated through an application of a round-robin distribution scheme to the functional egress ports. Additionally or alternatively, in some embodiments, reallocating the buckets may include appending to a next egress port in a sequence and applying the round-robin distribution scheme beginning at the next egress port. In this and other embodiments, calculating the next egress port may include using a modulo operation.

At 416, the method may include transmitting one or more buckets reallocated to the at least one functional egress port according to the reallocation.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
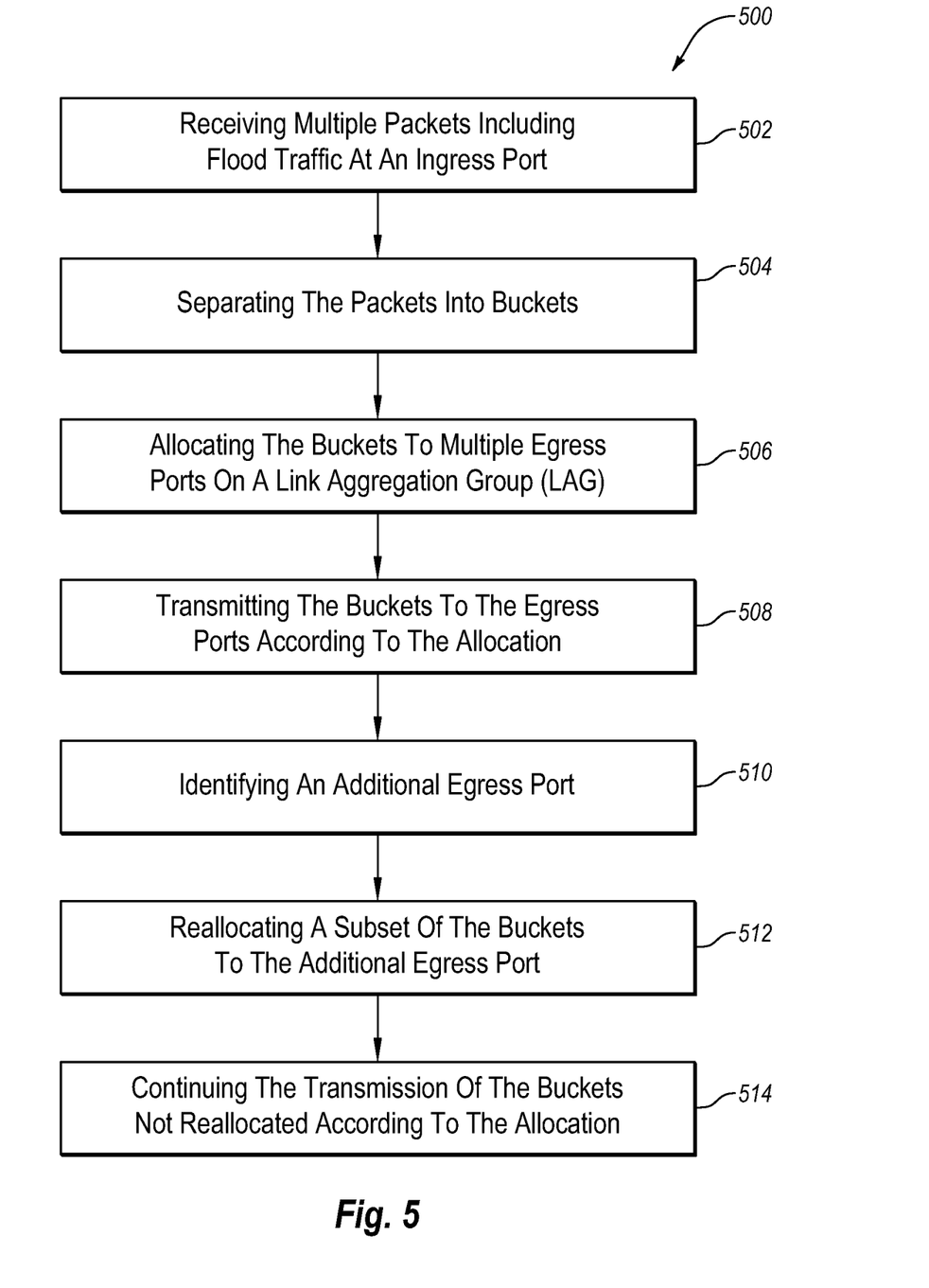
FIG. 5 is a flow diagram of an example method for reallocating buckets following an addition of an egress port.

FIG. 5 illustrates a flowchart of an example method 500 for reallocating buckets following an addition of an egress port. The method 500 may be implemented in the network 10 of FIG. 1 and may be performed by the network element 120A of FIGS. 1 and 2 in some embodiments.

The method 500 may begin at 502 by receiving multiple packets including flood traffic at an ingress port. The packets may include various data including unicast, broadcast, or multicast data traffic.

At 504, the method 500 may include separating the packets into buckets. The packets may be separated by applying a hash rule. The hash rule may hash the packets according to MGID, for example. In some embodiments, the packets may be separated into eight buckets.

At 506, the method 500 may include allocating the buckets to multiple egress ports on a link aggregation group (LAG). In some embodiments, the allocating the buckets may include allocating the buckets to multiple logical ports of the LAG that correspond one-to-one to the egress ports. Additionally, allocating the buckets to the egress ports may include applying a round-robin distribution scheme.

At 508, the method 500 may include transmitting the buckets to the egress ports according to the allocation.

At 510, the method 500 may include identifying an additional egress port. The additional egress port may include an egress port that was physically added to a network element such as through the addition of an egress line card. Alternatively, the additional egress port may include a pre-existing egress port that previously failed and has been repaired.

At 512, the method 500 may include reallocating a subset of the buckets to the additional egress port. In some embodiments, reallocating a subset of the buckets to the additional egress port may include identifying an existing egress port of the egress ports allocated a disproportional quantity of the buckets. The disproportional quantity of the buckets may occur when the number of buckets does not divide evenly among the number of egress ports in the LAG. In this and other embodiments, once the disproportional quantity of the buckets is identified, the reallocating may further include removing an excess quantity of buckets from the existing egress port that causes the disproportionality and reallocating the excess quantity of buckets to the additional egress port.

Additionally or alternatively, in some embodiments, reallocating a subset of the buckets to the additional egress port achieves a reallocation with the number of buckets allocated to each egress ports equal to the number of buckets allocated through an application of a round-robin distribution scheme.

In yet alternative embodiments, reallocating a subset of the buckets may include calculating a next port in a sequence using a modulo operation; appending to the next egress port; and applying the round-robin distribution scheme beginning at the next egress port.

At 514, the method 500 may include continuing the transmission of the buckets not reallocated according to the allocation. That is, after the additional egress port has been identified, the LAG may include the additional egress port, the existing port, and other egress ports. The buckets allocated to the other egress ports and the buckets not reallocated on the existing egress ports may continue to transmit uninterrupted throughout the method 500 according to some embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
receiving a plurality of packets including flood traffic at an ingress port;
separating the plurality of packets into buckets;
numbering a plurality of logical ports that correspond one-to-one to a plurality of egress ports of a link aggregation group (LAG);
allocating the buckets to a plurality of egress ports according to the numbering of the plurality of logical ports;
transmitting the buckets to the plurality of egress ports according to the allocation;
identifying a failed egress port;
in response to identifying the failed egress port;
renumbering the logical ports corresponding to functional egress ports while continuing to transmit the buckets allocated to functional egress ports according to the allocation prior to the identification of the failed egress port;
reallocating the buckets previously allocated to the failed egress port to the functional egress ports, wherein the reallocating includes:
calculating a number assigned to a next logical port based on a modulo operation of a number of the buckets (m) and a number of logical ports included in the LAG before identification of the failed egress port (n) (MOD(m,n)) and a relationship between m and a value of MOD(m,n)+1, the number being one of the numbers assigned during the renumbering;
appending to the next logical port as a first logical port in a sequence;
allocating a first bucket of the buckets previously allocated to the failed egress port to the first logical port; and
allocating one or more remaining buckets previously allocated to the failed egress port to one or more remaining logical ports; and
transmitting the one or more reallocated buckets to the functional egress port according to the reallocation.

2. The method of claim 1, wherein separating the plurality of packets into buckets includes applying a hash rule.

3. The method of claim 1, wherein allocating the buckets to the plurality of egress ports includes applying a round-robin distribution scheme.

4. The method of claim 3, wherein reallocating the buckets previously allocated to the failed egress port includes achieving a reallocation with the number of buckets allocated to the functional egress ports being equal to the number of buckets allocated through an application of the round-robin distribution scheme to the functional egress ports.

5. The method of claim 4 wherein reallocating the buckets further includes applying the round-robin distribution scheme beginning at the next egress port.

6. An article of manufacture comprising:
a non-transitory computer-readable medium having loaded thereon computer-executable instructions that are executable by a processor to perform the method of claim 1.

7. A network element comprising:
an ingress port configured to receive a plurality of packets including flood traffic;
a link aggregation group (LAG) including a plurality of egress ports;
an ingress line card configured to separate the plurality of packets into buckets, the plurality of egress ports corresponding one-to-one to a plurality of logical ports; and
a distributor configured to:
allocate the buckets to the plurality of egress ports according to a numbering of the plurality of logical ports,
transmit the buckets to the plurality of egress ports according to the allocation, and in response to a failed egress port being identified, renumber logical ports corresponding to functional egress ports and reallocate the buckets previously allocated to the failed egress port to at least one of the functional egress ports according to the renumbering of the logical ports corresponding to functional egress ports while continuing to transmit the buckets to functional egress ports of the LAG, wherein a reallocation of the buckets includes:
  calculating a number assigned to a next logical port based on a modulo operation of a number of the buckets (m) and a number of logical ports included in the LAG before identification of the failed egress port (n) (MOD(m,n)) and a relationship between m and a value of MOD(m,n)+1, the number being one of the numbers assigned during the renumbering;
  appending to the next logical port as a first logical port in a sequence;
  allocating a first bucket of the buckets previously allocated to the failed egress port to the first logical port; and
  allocating one or more remaining buckets previously allocated to the failed egress port to one or more remaining logical ports.

8. The network element of claim 7, wherein the distributor is further configured to,
  when an additional egress port is identified in the LAG:
  reallocate a subset of the buckets to the additional egress port; and
  continuously transmit buckets that are not reallocated.

9. The network element of claim 8, wherein when an additional egress port is identified in the LAG, the distributor is further configured to:
  identify an existing egress port having a disproportionate quantity of buckets allocated thereto;
  remove at least one excess bucket causing the disproportionality from the existing egress port; and
  reallocate the at least one excess bucket from the existing egress port to the additional egress port.

10. The network element of claim 7, further comprising:
  a plurality of egress line cards each including some subset of the plurality of egress ports such that the LAG includes egress ports on two or more egress line cards.

11. The network element of claim 7, wherein the distributor includes a switch fabric.

12. A method comprising:
  receiving a plurality of packets including flood traffic at an ingress port;
  separating the plurality of packets into buckets;
  numbering a plurality of logical ports that correspond one-to-one to a plurality of egress ports of a link aggregation group (LAG);
  allocating the buckets to the plurality of egress ports on the LAG;
  transmitting the buckets to the plurality of egress ports according to the allocation;
  identifying an additional egress port;
  in response to identifying the additional egress port: adding a logical port corresponding the additional egress port to the LAG;
  renumbering the logical ports of the LAG;
  reallocating a subset of the buckets to the additional egress port, wherein the reallocating the subset of the buckets includes:
    calculating a number assigned to a next logical port based on a modulo operation of a number of the buckets (m) and a number of logical ports included in the LAG before identification of the additional egress port (n) (MOD(m,n)) and a relationship between m and a value of MOD(m,n)+1, the number being one of the numbers assigned during the renumbering;
    appending to the next logical port as a first logical port in a sequence;
    allocating a first bucket of the buckets previously allocated to the plurality of egress ports to the first logical port; and
  continuing the transmission of the buckets not reallocated according to the allocation.

13. The method of claim 12 wherein reallocating the subset of the buckets further includes:
  identifying an existing egress port of the plurality of egress ports allocated a disproportional quantity of the buckets;
  removing at least one excess bucket causing the disproportionality from the existing egress port; and
  reallocating the at least one excess bucket to the additional egress port.

14. The method of claim 12, wherein separating the plurality of packets into buckets includes applying a hash rule that results in eight hash buckets.

15. The method of claim 12, wherein reallocating the subset of the buckets to the additional egress port includes achieving a reallocation with the number of buckets allocated to each egress ports being equal to the number of buckets allocated through an application of a round-robin distribution scheme.

16. An article of manufacture comprising:
  a non-transitory computer-readable medium having loaded thereon computer-executable instructions that are executable by a processor perform the method of claim 12.

17. A network element comprising:
  an ingress port configured to receive a plurality of packets including flood traffic;
  an ingress line card configured to separate the plurality of packets into buckets;
  a link aggregation group (LAG) including a plurality of egress ports; and
  a distributor configured to:
    allocate buckets to the plurality of egress ports, the plurality of egress ports corresponding one-to-one to a plurality of logical ports,
    transmit the buckets to the plurality of egress ports, and
    in response to an additional egress port identified in the LAG:
      add a logical port corresponding to the additional egress port to the LAG,
      renumber the logical ports of the LAG,
      reallocate a subset of the buckets to the additional egress port, wherein the reallocation includes:
        calculating a number assigned to a next logical port based on a modulo operation of a number of the buckets (m) and a number of logical ports included in the LAG before identification of the additional egress port (n) (MOD(m,n)) and a relationship between m and a value of MOD(m, n)+1, the number being one of the numbers assigned during the renumbering;
        appending to the next logical port as a first logical port in a sequence; and
        allocating a first bucket of the buckets previously allocated to the plurality of egress ports to the first logical port; and
    continuously transmit the buckets not reallocated.

18. The network element of claim 17, wherein the distributor is further configured to:
identify an existing egress port having a disproportionate quantity of buckets allocated thereto;
remove at least one excess bucket causing the disproportionality from the existing egress port; and
reallocate the at least one excess bucket from the existing egress port to the additional egress port.

19. The network element of claim 17, wherein the additional egress port includes a recovered egress port.

20. The method of claim 1, wherein the number assigned to the next logical port is calculated according to equations:

$$P\text{start}=\text{MOD}(m,n)+1;$$

$$\text{Next Port}=P\text{start};$$

if Next Port=failed port, then Next Port=MOD($m,n$)+2;

if $P\text{start}>m$, then Next Port=$P\text{start}-m;$ and if $P\text{start} \leq m$, then Next Port=Pstart, wherein:
Pstart is a starting port in the equations, and
failed port is the failed egress port.

21. The method of claim 12, wherein the calculating is performed according to equations:

$$P\text{start}=\text{MOD}(m,n)+1;$$

$$\text{Next Port}=P\text{start};$$

if Next Port=failed port, then Next Port=MOD($m,n$)+2;

if $P\text{start}>m$, then Next Port=$P\text{start}-m;$ and if Pstart $\leq$ m, then Next Port=Pstart, wherein:
Pstart is a starting port in the equations, and
failed port is a failed egress port.

22. The network element of claim 17, wherein the calculating is performed according to equations:

$$P\text{start}=\text{MOD}(m,n)+1;$$

$$\text{Next Port}=P\text{start};$$

if Next Port=failed port, then Next Port=MOD($m,n$)+2;

if $P\text{start}>m$, then Next Port=$P\text{start}-m;$ and if Pstart$\leq$m, then Next Port=Pstart, wherein:
Pstart is a starting port in the equations, and
failed port is a failed egress port.

23. The network element of claim 7, wherein the calculating is performed according to equations:

$$P\text{start}=\text{MOD}(m,n)+1;$$

$$\text{Next Port}=P\text{start};$$

if Next Port=failed port, then Next Port=MOD($m,n$)+2;

if $P\text{start}>m$, then Next Port=$P\text{start}-m;$ and if Pstart$\leq$m, then Next Port=Pstart, wherein:
Pstart is a starting port in the equations, and
failed port is the failed egress port.

* * * * *